US008544732B2

(12) United States Patent  (10) Patent No.: US 8,544,732 B2
Carragher  (45) Date of Patent: Oct. 1, 2013

(54) CONTROLLING CARD-BASED GREENLIFE COMPUTING

(75) Inventor: Philip Carragher, Glencoe, IL (US)

(73) Assignee: H.O.M.E. Mortgage Card, LLC, Glencoe, IL (US)

(*) Notice: Subject to any disclaimer, the term of this patent is extended or adjusted under 35 U.S.C. 154(b) by 742 days.

(21) Appl. No.: 11/760,361

(22) Filed: Jun. 8, 2007

(65) Prior Publication Data

US 2007/0284438 A1 Dec. 13, 2007

Related U.S. Application Data

(60) Provisional application No. 60/811,947, filed on Jun. 8, 2006.

(51) Int. Cl.
*G06K 5/00* (2006.01)

(52) U.S. Cl.
USPC .......................................... 235/380; 235/382

(58) Field of Classification Search
USPC ................... 235/379, 380, 382; 705/26, 30, 705/33, 35, 40, 1, 15
See application file for complete search history.

(56) References Cited

U.S. PATENT DOCUMENTS

| 6,049,778 | A  | * | 4/2000  | Walker et al. ............. 705/14.14 |
| 6,442,609 | B1 | * | 8/2002  | Lambert et al. ............... 709/227 |
| 6,557,032 | B1 | * | 4/2003  | Jones et al. ..................... 709/220 |
| 7,566,000 | B2 | * | 7/2009  | Agostino et al. .............. 235/375 |
| 7,937,320 | B2 | * | 5/2011  | Shuster .......................... 705/39 |
| 2002/0128916 | A1 | * | 9/2002  | Beinecke, III .................. 705/26 |
| 2003/0110125 | A1 | * | 6/2003  | Carragher ....................... 705/38 |
| 2004/0215507 | A1 | * | 10/2004 | Levitt et al. ..................... 705/14 |
| 2004/0249710 | A1 | * | 12/2004 | Smith et al. ..................... 705/14 |
| 2006/0089851 | A1 | * | 4/2006  | Silby et al. ........................ 705/1 |
| 2006/0208065 | A1 | * | 9/2006  | Mendelovich et al. ....... 235/380 |
| 2010/0217709 | A1 | * | 8/2010  | Aabye et al. .................... 705/44 |
| 2010/0259719 | A1 | * | 10/2010 | Sabeta ........................... 351/161 |

* cited by examiner

*Primary Examiner* — Thien M Le

(74) *Attorney, Agent, or Firm* — Beem Patent Law Firm

(57) ABSTRACT

An electrical digital computer machine and a data processing system, methods of making and for using the machine, products produced thereby, as well as data structures and articles of manufacture pertaining thereto, and all necessary intermediates of that which is discussed herein, all in the field of computerized aspects of CARD crediting or debiting to GREENLIFEs, e.g. organic food bill and the like.

More particularly, there can be a computer system applying a CARD debit or credit to a GREENLIFE. Another approach can include: a first computer system enabling a debit to be incurred in connection with usage of a CARD, such as a debit, credit, or membership card; and a second computer system enabling a GREENLIFE, such as a utility bill, and applying the debit or credit to the GREENLIFE.

20 Claims, 1 Drawing Sheet

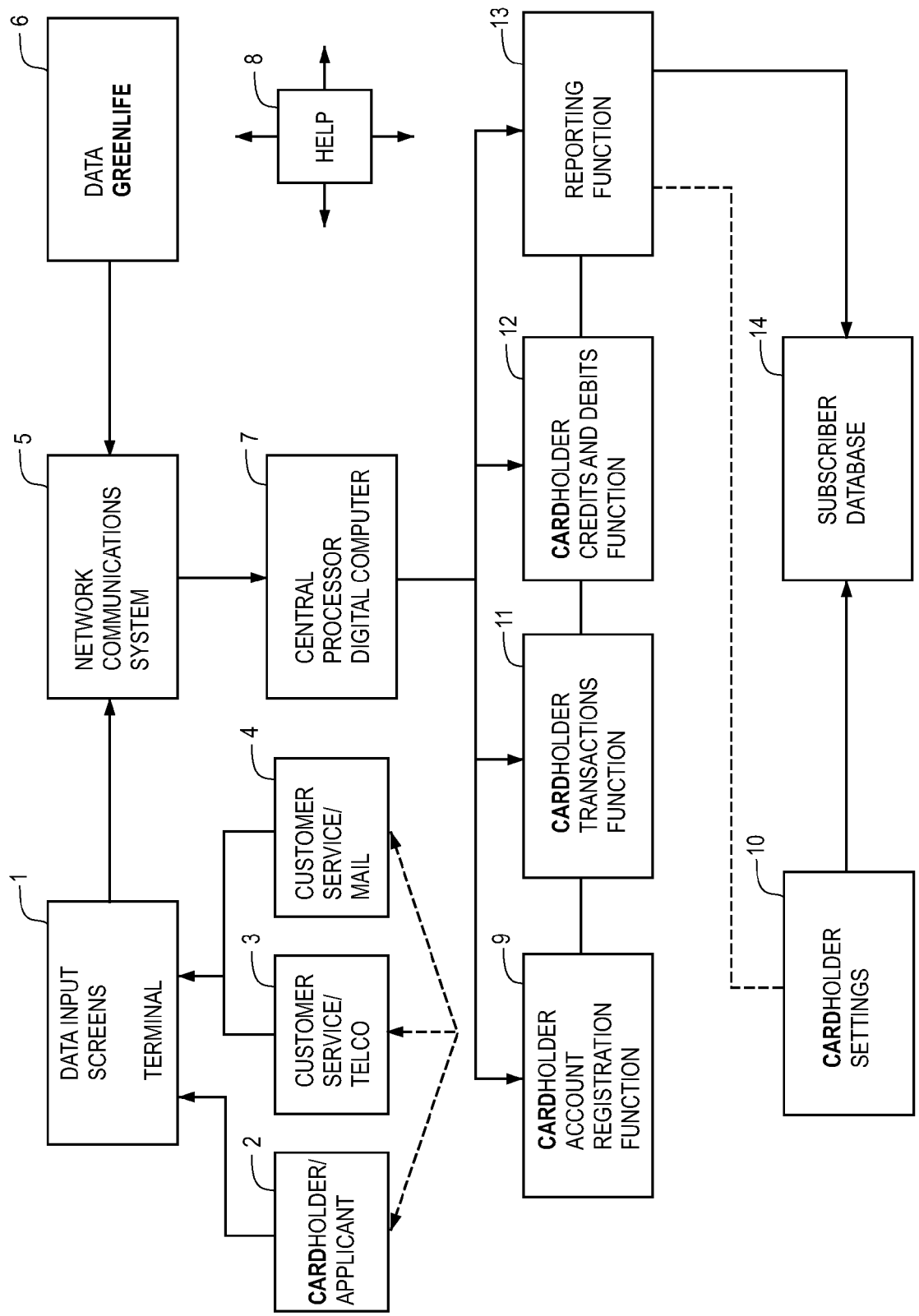

CONTROLLING CARD-BASED GREENLIFE COMPUTING

I. PRIORITY DATA

The present patent application claims benefit from and incorporates by reference U.S. Patent Application Ser. No. 60/811,947, filed Jun. 8, 2006, with the same inventor and title. This patent application further incorporates by reference U.S. Patent Application Ser. No. 60/660,693 filed by the same inventor on 11 Mar. 2005, and U.S. patent application Ser. No. 09/604,696, filed 26 Jun. 2000, and U.S. patent application Ser. No. 09/669,196, filed 25 Sep. 2000. U.S. patent application Ser. No. 09/669,196, filed 25 Sep. 2000 is a continuation-in-part of U.S. patent application Ser. No. 09/604,696, filed 26 Jun. 2000.

II. TECHNICAL FIELD

The technical field is computers and data processing systems. Depending on the implementation, there is apparatus, a method for use and method for making, and corresponding products produced thereby, as well as data structures, computer-readable media tangibly embodying program instructions, manufactures, and necessary intermediates of the foregoing, each pertaining to computer-aided aspects of CARD crediting and debiting to GREENLIFEs and the like. More particularly, embodiments can relate to a digital electrical data processing system having particular utility in financial fields related hereto. Still more particularly, embodiments can pertain to CARD (e.g., but not limited to charge CARD, bank CARD, contactless CARD, smart CARD, debit CARD, account, radio frequency identification products and services, etc.) activity-based GREENLIFE crediting and debiting, along with automated generation of related documentation, inter-computer communications, and networking.

II. DISCLOSURE

In the area of said technical field, representatively, consider a computer system (illustratively representing, for the sake of brevity, methods, articles of manufacture, transmitter, receiver, network implementations, etc.) structured to aid in controlling computing in such exemplary (and not limiting) embodiments as controlling CARD-based GREENLIFE computing, e.g. wind power related energy bill crediting and debiting.

CARD is an account that can take the form but is not limited to a payment or stored-value CARD, credit or debit CARD, payment account, energy or other tradable credits, other electronic currencies, or guarantees. CARD can be used to but is not limited to purchase, query, reserve, or receive goods and services with [incentives and rewards (Rewards)] features for patronizing the businesses or services of coalition members or other entities. Coalition members (which includes CARDholders) engage in various policies and practices tied to ["green practices" or "social agendas", herein called GREEN PRACTICES] such as but not limited to renewable and responsible energy use, organic foods, belief systems that emphasize but are not limited to openness, transparency, honesty, non-violence, education, childcare, health, safety, religious beliefs, and patronizing minority owned businesses. Coalition and non-coalition members sell products and services purchased or contracted by CARD and these transactions or contracts are bills or accounts called GREEN-LIFE. Rewards vary based on differing criteria but are not limited to spend, need, energy and tradable credits, and specific or bundled products and services. A database of members and entities can be maintained and queried with offerings advantageous to the coalition, other entities, and various GREEN PRACTICES.

CARD can be but is not limited to a charge, debit, membership, contactless CARD, radio frequency identification product or service, bank account, connected to a paycheck or periodic check such as a welfare check, business, health, or government account. Coalition and non-coalition members can be involved directly or indirectly in green practices or social agendas. They may but are not limited to sell, produce, incentivize, trade, consume, promote, build, support, advertise, represent, service, and transmit GREEN PRACTICE products or services.

An example of GREEN PRACTICE but not limited to this practice involves renewable energy types. Examples of these are but not limited to solar, wind, hydro, battery, organic matter, and may provide varying Rewards for coalition members to use their power or use their goods and services and may be used to create, improve, fix, support, or promote systems that will generate, trade, use, improve, support, promote that power. Rewards can result from but are not limited to consumption, donation, payment, guarantee, trading, and generation of renewable energy.

Governments and their agencies, public transportation, businesses, coalition members, and entities that promote and support GREEN PRACTICES may have policies and practices consistent with but not limited to better health, safety, and welfare for people, animals, living creatures, communities, countries, and the universe at large. Examples of these practices are but are not limited to sustainable agriculture, social responsibility and entrepreneurship, and improving conditions around parenting, global warming, war, genocide, terrorism, education, housing, disadvantaged people and communities, rain forests, pollution, and resource usage and allocation and production issues. An example of a service type with GREEN PRACTICES could be but isn't limited to virtual services such as internet, cell phone, and portable computer communications systems that reduce travel with virtual meetings, conferences, and classrooms.

Another example is virtual health services. Another example of health services is a CARD tied to an individual, group, or business related health savings account whereby Rewards incur for but not limited to using the CARD, using specific providers and services, immediate payment, access to insurance provider's system using codes for services provided so as to approve or disapprove services or approve limited amounts or provide varying Rewards. Debits and credits can flow into and out of heath savings account or flex account or any other health related account.

All of these GREEN PRACTICE products and services can give and receive Rewards. Examples of product types with GREEN PRACTICE characteristics are but are not limited to "green" structures such as homes and buildings built or retrofit with healthier and environmentally sensitive equipment, materials, designs, and appliances; other products could be hybrid vehicles and gasoline-types.

Participants in GREEN PRACTICES may link together via a website, search engine, or other communication means to maximize Rewards and savings possible through shared purchasing or use. Participants may use peer-to-peer systems to inform others about products and services that, because others may also participate in the product or service, will, in effect, improve an aspect of the transaction; for example, but not limited to, if a participant buys a hybrid vehicle and others do so that original participant may receive a better price or package or Rewards even after the vehicle was purchased.

Pre-purchase, post-purchase, and point-of-sale queries can lead to an advantage to all peers who participate.

Rewards can vary within categories: for instance, but not limited to, gasoline-types whereby Rewards would be greater for a gasoline having a higher percentage of ethanol in it. CARD use may automatically compute lower prices for preferred products or services; for instance, but not limited to stored-value gasoline CARDs may allow for more gas to be purchased for a fixed amount if they pumped a "greener" gasoline.

GREEN PRACTICES with health and virtual services such as but not limited to internet, conferences, meetings, phone, homework, health, the securities markets, and businesses involved in real assets and chattel and various services will provide Rewards for GREEN PRACTICE structures, land, and products used in and out of the home and business, usage, policies, and practices. For instance, homebuilders, lenders, home buyers, and related entities will help the informed CARDholder to maximize Rewards available through the coalition; lawn services using quieter equipment, less polluting equipment, and renewable or less energy are another example; hybrid cars and preferred gasoline types can also participate; health providers that limit exposure to radiation or travel for doctors' visits may participate.

Ratings can be generated and communicated that measure the degree to which the coalition member or outside entity follows GREEN PRACTICE standards. Purchases can be monitored for GREEN PRACTICE standards and options can be provided either prior to, at point-of-sale, or afterwards for other goods and services identical or related to that may be of value to coalition members.

Consumers or entities in need of help with their energy needs such as their bills, etc. may receive help from the coalition and coalition members who may have accumulated Rewards through donations or as a policy or practice of the entity, coalition members, or the GREENLIFE CARD system. For instance, members may want to but are not limited to donate Rewards to help veterans to pay their heating bills or single moms' transportation-to-work costs.

The media and other promotional and advertising services will present the CARD and its possibilities through its various facilities and could be a coalition member. Any purchasing, consuming, servicing, or generating entity can make use of this CARD and its Rewards as can others.

III. BRIEF DESCRIPTION OF THE DRAWINGS

FIG. 1 is an illustration of an embodiment focusing on hardware features;

As used herein, "embodiment" should not be construed as the sole manner, but rather as an illustrative teaching, much as though teaching mathematical addition does not require setting out every numerical combination to convey the concept extending beyond the teaching examples.

IV. MODES

The accompanying drawings illustrate embodiments intended to illustrate and exemplify in a teaching manner.

As used herein, the term "computer" generally refers to hardware or hardware in combination with one or more program(s), such as can be implemented in software. Computer aspects can be implemented on general purpose computers or specialized devices, and can operate electrically, optically, or in any other fashion. A computer as used herein can be viewed as at least one computer having all functionality or as multiple computers with functionality separated to collectively cooperate to bring about the functionality. Logic flow can represent signal processing, such as digital data processing, communication, or as evident from the context hereinafter. Logic flow or "logic means" can be implemented in discrete circuits, programmed computer, or the equivalent. Computer-readable media, as used herein can comprise at least one of a RAM, a ROM, A disk, an ASIC, and a PROM. Industrial applicability/technical affect is clear from the description, and is also stated below, e.g., as regards controlling a computer system, or part thereof, so as to affect efficiency management of computer resources, rate and manner of data transfer (e.g., by way of standardizing data by template input or computers in the system adapted to cooperate such as by "knowing" the format, order, and/or significance to attribute to data being transmitted/received.

By way of the following prophetic teaching, there can be computer support, as in a data processing system, for implementing parts of, or from, a financial product or instrument to accomplish certain financial objectives to and advance such as efficiency and/or security, over said manual systems and corresponding problems, and automated variants having limitations regarding management of corresponding computer resources. The computer system can have control means, varying from a menu to other means facilitating human control over the computer system so as to enable and disenable carrying out some or all of the functionality characterized herein. Representatively (and not hereby limiting), the functionality can include enabling and/or disabling any one or more of:

associating CARD activity to increase and/or reduce GREENLIFE credit and debit or GREENLIFE-related cost (the term "GREENLIFE" being used broadly to encompass, for example, but not limited to an account, bill, purchase price, debt, credit, security, fee, forward contract, tied to a coalition member and entity engaged in "green" policies and practices and social agendas such as but not limited to renewable energy, sustainable agriculture, non-violence, helping disadvantaged people, communities, and countries, etc.

allocating CARD-related amounts to a GREENLIFE;

paying GREENLIFEs in combination or association with CARD activity;

associating a GREENLIFE and a CARD in a manner that is Sharia compliant;

communicating data relating to CARD/GREENLIFE computing;

utilizing data input screens or templates in forming a data standard enabling carrying out the communication in a manner suitable for integrated computing, e.g., as regards GREENLIFE's, wind power, sustainable farming, and other GREENLIFE-related business;

facilitating trading of GREENLIFEs related to CARD activity such as but not limited to energy and pollution credits;

facilitating consumer access to at least some CARD/GREENLIFE computing;

enabling a reward system, even implemented in real time, sustaining the consumer's perspective of the value of the credit CARD thus increasing the likelihood of retaining the consumer's business;

enabling an amount from an unpaid CARD debit to be added to a GREENLIFE such as but not limited to a utility bill, phone bill, mortgage, forward contract, etc. enabling an ongoing relationship between CARD usage and a GREENLIFE provider or holder;

These and/or the other computer-aided embodiments herein, as apparent from the specification as a whole, can be carried out by providing an improved digital electrical computer-based system configured to address and/or control the embodiments. The system can, as may be desired in one application or another, be thought of as including a machine (programmed computer or computers), methods for making and using the same, products produced by thereby, data structures, and necessary intermediates (e.g., data computed along the way). The system, as may be desired in one application or another, be thought to include a system such as that for CARD (i.e, but not limited to bank, credit, debit, contactless, radio frequency identification products and services, cell phone, account, bill, tradable credits or debits, guarantees, and other forms of electronic currency or the like) activity-based GREENLIFE crediting and/or debiting. More particularly, the foregoing can be carried out by steps including: associating CARD activity with a GREENLIFE of a CARDholder; crediting and/or debiting an amount to the GREENLIFE responsive to the CARD activity (which may be balance on the CARD, e.g., after some period of time); and generating output including the charge CARD activity-based GREENLIFE crediting and/or debiting; wherein at least some of the steps are carried out by a digital electrical computer system. Note that the system may be directed to crediting or to debiting or to both—this is a matter of choice in preferred embodiment for a particular circumstance or application.

In any of the embodiments, the method can be carried out further including the step of: communicating a funds transfer to the CARDholder.

In any of the embodiments, the method can be carried out with the step of communicating including: printing a check for the amount; printing a coupon with the amount for carrying out payment of the GREENLIFE or CARD with the check; and combining the check and the coupon with a statement of the CARD activity in an envelope so as to address the envelope to the CARDholder.

In any of the embodiments, the method can be carried out further including the step of: communicating a funds transfer to a GREENLIFE or a funds transfer from the GREENLIFE, associating CARD activity with an internal GREENLIFE, which is a GREENLIFE either wholly or partially within the CARD issuer's or purveyor's corporation, company, subsidiary, affiliate, or related entity, and associating CARD activity with an external GREENLIFE, which is the GREENLIFE not being part of the CARD issuer's or purveyor's corporation, company, subsidiary, affiliate, or related entity.

In any of the embodiments, the method can be carried out such that the communicating includes an electronic funds transfer.

In any of the embodiments, the method can be carried out such that the communicating includes: printing a check for the amount; printing a coupon with the amount for carrying out payment of the GREENLIFE or CARD with the check; and combining the check and the coupon with a statement of the CARD activity in an envelope so as to address the envelope to the GREENLIFE or CARD issuer.

In any of the embodiments, the method can be carried out further including the step of: computing a forecast for repayment of the GREENLIFE from the CARD activity or increase of payment; and wherein: the step of generating output includes generating output including the forecast.

In any of the embodiments, the method can be carried out further including the step of: communicating the forecast and payment changes to the CARDholder.

In any of the embodiments, the method can be carried out further including the step of: changing an allocation of the credit and debit activity with the GREENLIFE in response to an instruction from the CARDholder.

In any of the embodiments, the method can be carried out further including the step of: changing an allocation of the credit and debit activity between the GREENLIFE and a second GREENLIFE in response to an instruction from the CARDholder.

In any of the embodiments, the method can be carried out further including the step of: changing an allocation of the credit and debit activity with the GREENLIFE in response to an instruction from the GREENLIFE holder.

In any of the embodiments, the method can be carried out further including the step of: changing an allocation of the credit and debit activity between the GREENLIFE and a second GREENLIFE in response to an instruction from the GREENLIFE holder.

In any of the embodiments, the method can be carried out such that the step of changing is carried out in response to the instruction from the GREENLIFE holder received over a network.

In any of the embodiments, the method can be carried out further including: allocating a portion of the credit and debit activity between the GREENLIFE and a charity; and issuing a tax deduction statement to the CARDholder.

In any of the embodiments, the method can be carried out still further including: allocating contributions received from a charity or other assistance program to the CARDholder.

In any of the embodiments, the method can be carried out further including the steps of: computing an annual statement of said crediting and debiting; and communicating the annual statement to the CARDholder.

In any of the embodiments, the method can be carried out such that the step of computing an annual statement includes: computing GREENLIFE interest paid by the crediting.

In any of the embodiments, the method can be carried out further including the steps of: associating a monthly payment with the GREENLIFE; and communicating a funds transfer including the payment to a GREENLIFE.

In any of the embodiments, the method can be carried out further including the steps of: associating an allocation of the credit and debit activity with the GREENLIFE and with a second GREENLIFE of the CARDholder; wherein the step of crediting and debiting the amount to the GREENLIFE is also responsive to the allocation; and further including crediting and debiting a second amount to the second GREENLIFE responsive to the allocation; wherein the step of generating the output includes generating the output including the crediting and debiting a second amount to the second GREENLIFE.

In any of the embodiments, the method can be carried out further including the step of: associating the GREENLIFE with second CARD activity of a second CARDholder; crediting an amount to the GREENLIFE responsive to the second CARD activity; and wherein the step of generating output includes generating the output including the second charge CARD activity-based GREENLIFE crediting and debiting.

In any of the embodiments, the method can be carried out further including the step of: generating second output including the second charge CARD activity-based GREENLIFE crediting and debiting, but not including the CARD activity of the CARDholder of the GREENLIFE; and communicating the second output to the second CARDholder.

In any of the embodiments, the method can be carried out further including the step of: communicating a funds transfer to a charity for payment of the GREENLIFE.

In any of the embodiments, the method can be carried out further including the step of: using a second computer to compute a valuation of a GREENLIFE-backed security in response to indicia of said crediting and debiting.

In any of the embodiments, the method can be carried out, or perhaps viewed differently, as a method for carrying out CARD activity-based GREENLIFE crediting and debiting, the method including the steps of: forming a combination in an envelope, the combination including at least two of: a check printed with an amount to pay a GREENLIFE and CARD balance, said amount determined by crediting and debiting responsive to CARD activity of a CARDholder; a coupon printed with the amount for making the payment of the GREENLIFE and CARD balance with the check; and a statement of showing the CARD activity and the crediting and debiting.

In any of the embodiments, the method can be carried out such that the step of forming includes three of said check, said coupon and said statement; and further including the step of: printing an address on the envelope so as to address the envelope to the CARDholder.

In any of the embodiments, the method can be carried out such that the step of forming is carried out with at least two of said check and said coupon; and further including the steps of: printing an address on the envelope so as to address the envelope to a GREENLIFE and CARD issuer; combining said statement with a second envelope; and printing an address on the second envelope so as to address the second envelope to the CARDholder.

In any of the embodiments, the method can be carried out, or perhaps viewed differently, as a method for making a digital electrical computer system corresponding to carrying out one or more activities indicated herein, for example, programmed for carrying out CARD activity-based GREENLIFE crediting and debiting.

In any of the embodiments, the method can be carried out including the steps of: providing a digital electrical computer and data processing system comprising a digital electrical computer electrically connected to an input device for inputting data and to an output device; and programming the digital electrical computer to associate CARD activity with a GREENLIFE of a CARDholder, to credit and debit an amount to the GREENLIFE responsive to the CARD activity, and to generate output including the charge CARD activity-based GREENLIFE crediting and debiting, to form the digital electrical computer system programmed for carrying out CARD activity-based GREENLIFE crediting and debiting.

In any of the embodiments, the method can be carried out such that the programming includes programming the digital electrical computer to trigger an electronic funds transfer to another digital electrical computer.

In any of the embodiments, the method can be carried out, or perhaps viewed differently, as a digital electrical computer system programmed for carrying out CARD activity-based GREENLIFE crediting and debiting, the computer system including: a digital electrical computer and data processing system comprising a digital electrical computer electrically connected to an input device for inputting data and to an output device, said digital electrical computer programmed to associate CARD activity with a GREENLIFE of a CARDholder, to credit and debit an amount to the GREENLIFE responsive to the CARD activity, and to generate output including the charge CARD activity-based GREENLIFE crediting and debiting, said output including at least two of: a check printed with an amount to pay a GREENLIFE and CARD balance, said amount determined by crediting and debiting responsive to CARD activity of a CARDholder; a coupon printed with the amount for making the payment of the GREENLIFE and CARD balance with the check; and a statement of showing the CARD activity and the crediting and debiting.

In any of the embodiments, the method can be carried out, or perhaps viewed differently, as a method for carrying out computerized CARD activity-based GREENLIFE crediting and debiting, the method including the step of: crediting and debiting CARD activity to a GREENLIFE payment in response to an instruction from a GREENLIFE holder received over the Internet.

In any of the embodiments, the method can be carried out, or perhaps viewed differently, as a method for carrying out adjusting an allocation for a GREENLIFE payment, between GREENLIFEs or in an amount such as pay off, or more rapid or slower payment, from the GREENLIFE holder.

Along analogous lines, an embodiment can also be viewed as a method for CARD activity-based GREENLIFE expense crediting, the method including the steps of: associating CARD activity with an external GREENLIFE expense; crediting an amount to the GREENLIFE expense responsive to the CARD activity; and generating output including the CARD activity-based GREENLIFE expense crediting; wherein at least some of the steps are carried out by computer.

In any of the embodiments, the method can be carried out, or perhaps viewed differently as including the step of: applying some of the amount in a funds transfer to pay the expense.

In any of the embodiments, the method can be carried out, or perhaps viewed differently such that the step of associating CARD activity with an external GREENLIFE expense includes the step of entering external GREENLIFE-identifying data; and carrying out the step of crediting according to the data.

In any of the embodiments, the method can be carried out, or perhaps viewed differently such that the step of associating CARD activity with an external GREENLIFE expense includes the step of entering external GREENLIFE-identifying data; and carrying out the step of crediting according to the data.

Another view is that an embodiment can encompass a method for CARD activity-based GREENLIFE expense crediting, the method including the steps of: associating CARD activity with a non-GREENLIFE GREENLIFE expense; crediting an amount to the GREENLIFE expense responsive to the CARD activity; applying some of the amount to produce a payment for the expense; and generating output including the crediting and the applying; wherein at least some of the steps are carried out by computer.

In any of the embodiments, the method can be carried out, or perhaps viewed differently such that the step of applying includes producing a payment of a cost from the group consisting of appliance acquisition, appliance upgrade, and a material upgrade as the payment for the expense.

In any of the embodiments, the method can be carried out, or perhaps viewed differently such that the step of applying includes producing a payment of a rent as the payment for the expense.

In any of the embodiments, the method can be carried out, or perhaps viewed differently as including the step of: applying a preferential crediting rate in the crediting for an internal expense.

In any of the embodiments, the method can be carried out, or perhaps viewed differently such that the step of applying is carried out in response to an instruction received over the Internet.

In any of the embodiments, the method can be carried out, or perhaps viewed differently such that the step of applying includes printing a check for the amount; printing a coupon with the amount for carrying out payment of the GREENLIFE with the check; and combining the check and the coupon with a statement of the CARD activity in a computer-addressed envelope so as to address the envelope.

In any of the embodiments, the method can be carried out, or perhaps viewed differently, including the step of: changing an allocation of the credit activity between expenses in response to an instruction from the CARDholder.

In any of the embodiments, the method can be carried out, or perhaps viewed differently as including the step of: allocating a portion of the credit activity to a charity; and issuing a tax deduction statement responsive to the portion.

In any of the embodiments, the method can be carried out, or perhaps viewed differently as including the steps of: computing an annual statement of said crediting; and communicating the annual statement to the CARDholder.

In any of the embodiments, the method can be carried out, or perhaps viewed differently as including the steps of: allocating a portion of the amount between multiple GREENLIFEs.

In any of the embodiments, the method can be carried out, or perhaps viewed differently as including the steps of: associating the expense with second CARD activity of a second CARDholder; crediting an amount to the expense responsive to the second CARD activity; and wherein the step of generating output includes generating the output including the second charge CARD activity-based crediting.

In any of the embodiments, the method can be carried out, or perhaps viewed differently as including the step of: communicating a funds transfer to a charity for payment of the expense.

Still another view is that an embodiment can encompass a method for carrying out CARD activity-based GREENLIFE expense crediting, the method including the steps of: forming a combination in an envelope, the combination including at least two of: a check printed for the payment of the expense; a coupon printed for making the payment with the check; and a statement of showing the CARD activity and the crediting.

Still another view is that an embodiment can encompass a digital electrical computer system programmed for carrying out CARD activity-based GREENLIFE expense crediting, the method including the steps of: providing a digital electrical computer and data processing system comprising a digital electrical computer electrically connected to an input device for inputting data and to an output device; and programming the digital electrical computer to associate CARD activity with an external GREENLIFE expense, to credit an amount to the expense responsive to the CARD activity, and to generate output including the CARD activity-based crediting, to form the digital electrical computer system programmed for carrying out CARD activity-based GREENLIFE crediting.

Still another view is that an embodiment can encompass a method for making a digital electrical computer system programmed for carrying out CARD activity-based GREENLIFE expense crediting, the method including the steps of: providing a digital electrical computer and data processing system comprising a digital electrical computer electrically connected to an input device for inputting data and to an output device; and programming the digital electrical computer to associate CARD activity with an external GREENLIFE expense, to credit an amount to the expense responsive to the CARD activity, and to generate output including the CARD activity-based crediting, to form the digital electrical computer system programmed for carrying out CARD activity-based GREENLIFE crediting.

Still another view is that the an embodiment can encompass a method for making a digital electrical computer system programmed for carrying out CARD activity-based GREENLIFE expense crediting, the method including the steps of: providing a digital electrical computer and data processing system comprising a digital electrical computer electrically connected to an input device for inputting data and to an output device; and programming the digital electrical computer to associate CARD activity with a non-GREENLIFE expense, to credit an amount to the expense responsive to the CARD activity, to apply some of the amount to produce a payment for the expense, and to generate output including the crediting and applying, to form the digital electrical computer system programmed for carrying out CARD activity-based GREENLIFE crediting.

Still another view is that an embodiment can encompass a digital electrical computer system programmed for carrying out CARD activity-based GREENLIFE expense crediting, the computer system including: a digital electrical computer and data processing system comprising a digital electrical computer electrically connected to an input device for inputting data and to an output device, said digital electrical computer programmed to associate CARD activity with a non-GREENLIFE expense, to credit an amount to the expense responsive to the CARD activity, to apply some of the amount to produce a payment for the expense, and to generate output including at least two of: a check printed for the payment of the expense; a coupon printed for making the payment with the check; and a statement of showing the CARD activity and the crediting.

Still another view is that an embodiment can encompass a digital electrical computer system programmed for carrying out CARD activity-based GREENLIFE expense crediting, the computer system including: a digital electrical computer and data processing system comprising a digital electrical computer electrically connected to an input device for inputting data and to an output device, said digital electrical computer programmed to associate CARD activity with an external GREENLIFE expense, to credit an amount to the GREENLIFE expense responsive to the CARD activity, to apply some of the amount to produce a payment for the expense, and to generate output including at least two of: a check printed for the payment of the expense; a coupon printed for making the payment with the check; and a statement of showing the CARD activity and the crediting.

Still another view is that an embodiment can encompass a method for carrying out computerized CARD activity-based GREENLIFE expense crediting, the method including the step of: crediting CARD activity to a non-GREENLIFE expense payment and/or an external expense payment in response to a CARDholder instruction received over the Internet.

FIG. 1 shows, in block diagram form, the computer-based elements, which can be utilized to implement a teaching embodiment. FIG. 1 is an overview. 1 Data Input Screens & Terminal (1).

Terminal 1 represents computers and computer screens used to enter data into the system, and to view data posted to the system. Virtually any current or recent model personal computer platform may be employed. A typical CARDholder (2) Data Input Screen could be an iMac personal computer connected to an Internet network interface using built-in 56K or Ethernet Internet Protocols. A typical Customer Service/Telco (3) Data Input Screen could be a Gateway 2000 PC running Windows 2000, a 16" Radius monitor, and a Local or Wide Area Network Ethernet connection to an internet network interface. Similarly, Customer Service/Mail (4) could be a Gateway 2000 PC running Windows 2000, a 20" Radius intelliColor e monitor, and a Local or Wide Area Network Ethernet connection to an Internet network interface. Frequently, the description will refer to the "user", meaning the system or part thereof is being accessed using a network-enabled computer by the CARDholder, a Telco representative, or a Mail representative.

Network Communications Systems (5)

With regard to Network Communications Systems (5), any upstream, internet Service Provider (ISP) utilizing TCP/IP to transmit data between Data Input Screens. Examples of ISPs include uunet, starnetusa, and Exodus. Well-known and accepted protocols may be any transmission standard able to conduct digital information, including optical, FireWire, fiber optic, infrared, cellular, wireless, hard wire, SCSI, ethernet, trunk lines, satellite, and other like systems, may be employed.

Central Processor & Digital Computer (7)

Central Processor & Digital Computer (7) represents the electrical computing devices that receive, process, store, analyze and distribute data. Numerous computing devices may be employed as business volume grows. The Central Processor and Digital Computer can be comprised of these components:

one or more CPUs (Central Processing Units);
one or more digital computers commonly referred to as "servers" ("servers" are the gateway between Local Area and Wide Area digital computers);
Data storage (hard drives)
Routers;
Applications, such as web browsers, word processors, database engines, etc.

CARD and GREENLIFE Data (6)

CARD & GREENLIFE Data (6) represents third-party data sent via Electronic File Transfer (EFT) and a TCP/IP network communications system (5). GREENLIFEs serviced by an embodiment may, on occasion, be bought and sold by GREENLIFE provisioners. Interaction with GREENLIFE provisioners is necessarily to enable the embodiment, i.e., to facilitate the payment of credits, and also to compute a valuation of a GREENLIFE-based security in response to indicia of said crediting. GREENLIFEs serviced by an embodiment may, on occasion, be solicited by other GREENLIFE provisioners offering more attractive rates and/or terms Help (8)

Help (8) represents the 0Ehow-to, and troubleshooting guide available at all times to CARDholders, CARDholder applicants, and customer service representatives. It is accessed via a web browser, such as version 4 or better of either Microsoft Internet Explorer or Netscape Navigator. Help is context-enabled, indexed, and searchable by keyword and phrase.

CARDholder Account Registration (9)

CARDholder Account Registration (9) illustrates how CARDholder applicants can begin the GREENLIFE-crediting process. In this exemplary description, CARDholders, CARDholder representatives, and user all refer to persons directly employing a network-enabled computer to access the embodiment.

CARDholder Transaction Function (11)

CARDholder Transaction Function (11) shows how credit or other CARD transaction activity is typically managed through a third party and transmitted to the system, where appropriate credits and debits are determined and issued.

CARDholder Credits and Debits Function (12)

CARDholder Credits and Debits Function (12) illustrates notable functions. Transaction data are processed and applied, subject to criteria established by the CARDholder, the CARD provider, other CARDholders, and Coalition members.

CARDholder Settings (10)

CARDholder Credits and Debits Function (12) shows how the CARDholder manages his/her credit and debit transfers through CARDholder Settings. The CARDholder may alter his/her credit Settings at any time, either directly via a Data Input Screen (2), or by using either Customer Service/Telco (3) or Customer Service/Mail (4) representative as an intermediary. Debit transfers may also be altered here but may involve approval of GREENLIFEe or third party.

Reporting Function (13)

Reporting Function (13,) illustrates a way for carrying out due diligence functions: (1) CARDholder statement generating; (2) tax compliance and document generating; (3) third party information exchange & verification.

Subscriber Database (14)

Subscriber Database (14) illustrates a representative central storage system for all individual CARDholder data.

Consider now an embodiment viable in its own right that happens to also be representative or a Sharia-compliant approach.

Illustrative (not intended to be limiting by a representative teaching) is a Shari'ah-compliant charge CARD (SCCC) linked to a GREENLIFE has previously eluded those in finance, but solutions are hereby proposed. A consumer who has a GREEN LIFE or is getting a GREENLIFE uses the SCCC. Each transaction generates a fee, let's call it a "guarantee fee" of a variable amount, and for illustration purposes let's say it is 6% of the purchase price. On a $100 purchase, the total cost becomes $106, and repayment can be structured over a specified time frame, say 12 months. In this instance, the consumer will pay $106/12 monthly for one year. If scheduled payments are not made on time, the late payment amount will transfer to a GREENLIFE balance. As payments of the late payment amount are made, that amount will be deducted from a GREENLIFE balance. Another method for incentivizing payments is to have the consumer donate to a charity and the embodiment makes provisions for this. Other forms of GREENLIFEs, such as phone bills and auto loans can also be linked to a credit CARD. Other assets can also be linked to the credit CARD like automobiles and equipment. Debt instruments or liens can be used to provide security for purchases.

Embodiments herein encompass an improved digital electrical computer-based system: a machine (programmed computer), methods for making and using it, products produced by the method, articles, data structures, and necessary intermediates, collectively referenced herein after as the method (for the sake of brevity). Accordingly the embodiment can be exemplified as a computer-aided method such as that for CARD (i.e, but not limited to bank, credit, debit, contactless, cell phone, account, bill, tradable credits or debits, guarantees, and other forms of electronic currency or the like) activity-based GREENLIFE crediting. More particularly, the foregoing can be carried out by steps including: associating CARD activity with a GREENLIFE of a CARDholder; crediting an amount to the GREENLIFE responsive to the CARD activity; and generating output including the charge CARD activity-based GREENLIFE crediting; wherein at least some of the steps are carried out by a digital electrical computer.

In any of the embodiments, the method can be carried out further including the step of: using a second computer to compute a valuation of a GREENLIFE-backed security in response to indicia of said crediting or debiting.

In any of the embodiments, the method can be carried out further including the step of: executing an agreement between customer, CARD issuer, and GREENLIFE for adding an amount to a GREENLIFE.

In any of the embodiments, the method can be carried out further including the step of: executing an agreement between GREENLIFE and investor for adding an amount to a GREENLIFE.

In any of the embodiments, the method can be carried out further including the step of: executing an agreement between customer and CARD issuer to have unpaid balances paid by a GREENLIFE.

In any of the embodiments, the method can be carried out further including the step of: executing an agreement between customer and GREENLIFE to pay unpaid CARD balances with proceeds derived from a GREENLIFE and add that balance to the GREENLIFE. In any of the embodiments, the method can be carried out further including the step of: executing agreements between parties reflective of state and country and treaty specific laws.

In any of the embodiments, the method can be carried out further including the step of: adding a balance service fee to the CARD balance for unpaid balances when payment is due.

In any of the embodiments, the method can be carried out further including the step of: adding an annual service fee to the CARD balance.

In any of the embodiments, the method can be carried out further including the step of: in the case of a Sharia compliant CARD, adding a transaction service fee, say 5% of the transaction amount, to the CARD balance.

In any of the embodiments, the method can be carried out further including the step of: periodically adding an amount to a GREENLIFE as exemplified by a GREENLIFE but adapted to include an unpaid CARD payment amount.

In any of the embodiments, the method can be carried out further including the step of: in the case of a Sharia compliant GREENLIFE, reducing and increasing ownership amounts of the co-owners and shareholders reflective of an increase in GREENLIFE balance. In any of the embodiments, the method can be carried out further including the step of: transferring funds to pay unpaid CARD balance.

In any of the embodiments, the method can be carried out further including the step of: periodically adding an amount to a second GREENLIFE but adapted to include an unpaid CARD payment amount.

In any of the embodiments, the method can be carried out further including the step of: creating secondary market investment vehicles for CARDs and GREENLIFEs linked in order to pay CARD balances with a GREENLIFE.

In any of the embodiments, the method can be carried out including the steps of: activating a Shari'ah compliant GREENLIFE with fungible balances.

In any of the embodiments, the method can be carried out including the steps of: communicating an increase in a GREENLIFE balance in response to a late or missing payment.

In any of the embodiments, the method can be carried out including the steps of: communicating an increase in an asset debt balance in response to a late or missing payment.

In any of the embodiments, the method can be carried out including the steps of: communicating an increase in a lien in response to a late or missing payment.

In any of the embodiments, the method can be carried out including the steps of: creating a lien in response to a late or missing payment.

In any of the embodiments, the method can be carried out including the steps of: calculating reward amount in response to CARD payment activity and crediting an optional amount to a GREENLIFE.

In any of the embodiments, the method can be carried out including the steps of: calculating reward amount in response to CARD payment activity and crediting an optional amount to a lien.

In any of the embodiments, the method can be carried out including the steps of: monitor CARD purchases for Shari'ah compliance.

Although only a few exemplary embodiments have been described in detail above, those skilled in the art will readily appreciate that many modifications are possible in the exemplary embodiments without materially from the novel teachings and advantages herein.

Accordingly, all such modifications are intended to be included within the scope defined by claims. In the claims, means-plus-function claims are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment fastening wooden parts, a nail and a screw may be equivalent structures.

I claim:

1. A method for generating and allocating rewards, comprising:
   receiving debit or credit activity incurred in connection with a CARD account;
   accessing a database of coalition members, the members including CARD account holders;
   accessing a database of products and services associated with any of renewable and responsible energy use, organic foods, belief systems, transparency, honesty, non-violence, education, childcare, health, safety, and minority owned businesses;
   monitoring the products and services at one or more of pre-purchase, point-of-sale, and post-purchase for compliance with standards relating to the products and services;
   associating the CARD account activity of one of the account holder members with an account associated with at least one of the products and services;
   crediting an amount as a reward, responsive to the CARD account activity, to the account associated with the products or services, and
   generating output including the crediting.

2. The method of claim 1, wherein the CARD is a debit card account.

3. The method of claim 1, wherein the CARD is a charge card account.

4. The method of claim 1, wherein the CARD is a membership card account.

5. A method for generating and allocating rewards, comprising:
   accessing memory for data corresponding to coalition members, the members including CARD account holders, and products and services associated with any of renewable and responsible energy use, organic foods, belief systems, transparency, honesty, non-violence, education, childcare, health, safety, and minority owned businesses,
   measuring a degree to which a coalition member follows standards promoting the products and services;
   generating a rating from the measurement;

allocating a portion of a CARD debit or credit, in response to CARD activity, as a reward to a bill or account associated with a first one of the products or services, and generating output including the crediting or debiting.

6. A method for generating and allocating rewards, comprising:
receiving information in memory, the information corresponding to coalition members, the members including CARD account holders, and products and services associated with any of renewable and responsible energy use, organic foods, belief systems, transparency, honesty, non-violence, education, childcare, health, safety, and minority owned businesses;
receiving an allocation instruction from a user;
applying a portion of a credit, in response to CARD activity and further to said allocation instruction, as a reward to one or more accounts associated with the products and services
wherein the allocation instruction is receivable at each of pre-purchase, post-purchase, and point-of-sale.

7. The method of claim 5, wherein the CARD is a debit card account.

8. The method of claim 5, wherein the CARD is a charge card account.

9. The method of claim 5, wherein the CARD is a membership card account.

10. The method of claim 6, wherein the CARD is a debit card account.

11. The method of claim 6, wherein the CARD is a charge card account.

12. The method of claim 6, wherein the CARD is a membership card account.

13. A method of using an apparatus, the method including:
accessing, by a computer apparatus, memory for data corresponding to coalition members, the members including CARD account holders, and to products and services associated with any of renewable and responsible energy use, organic foods, belief systems, transparency, honesty, non-violence, education, childcare, health, safety, and minority owned businesses;
applying, by the computer apparatus, a credit in response to CARD activity as a reward to a bill or account associated with the data;
applying, by the computer apparatus, a second credit in response to CARD activity of a second, separate CARD account holder as a reward to the same bill or account and
generating, by the computer apparatus, output including at least one of the first and second crediting.

14. The method of claim 13, wherein the CARD is a debit card account.

15. The method of claim 13, wherein the CARD is a charge card account.

16. The method of claim 13, wherein the CARD is a membership card account.

17. A computer system configured to generate rewards comprising:
a computer programmed to:
access memory for data corresponding to coalition members, the members including CARD account holders, and to products and services associated with any of renewable and responsible energy use, organic foods, belief systems, transparency, honesty, non-violence, education, childcare, health, safety, and minority owned businesses;
apply a credit, in response to CARD activity, as a reward to an account associated with one or more of the products or services;
generate output including the crediting; and
enable peer-to-peer communication to inform coalition members about purchases relating to the one or more products or services, wherein the purchases are identified for compliance with standards relating to the products or services.

18. The computer system of claim 17, wherein the CARD is a debit card account.

19. The computer system of claim 17, wherein the CARD is a charge card account.

20. The computer system of claim 17, wherein the CARD is a membership card account.

* * * * *